US009396880B2

(12) United States Patent
Stuart et al.

(10) Patent No.: US 9,396,880 B2
(45) Date of Patent: Jul. 19, 2016

(54) HIGH ENERGY DENSITY STORAGE DEVICE

(71) Applicants: Martin A. Stuart, Burbank, CA (US); Stephen L. Cunningham, Altadena, CA (US)

(72) Inventors: Martin A. Stuart, Burbank, CA (US); Stephen L. Cunningham, Altadena, CA (US)

( * ) Notice: Subject to any disclaimer, the term of this patent is extended or adjusted under 35 U.S.C. 154(b) by 35 days.

(21) Appl. No.: 14/549,879

(22) Filed: Nov. 21, 2014

(65) Prior Publication Data
US 2015/0077066 A1  Mar. 19, 2015

Related U.S. Application Data

(63) Continuation-in-part of application No. 14/357,676, filed as application No. PCT/US2012/064944 on Nov. 14, 2012, now Pat. No. 9,230,741.

(60) Provisional application No. 61/560,461, filed on Nov. 16, 2011, provisional application No. 61/906,965, filed on Nov. 21, 2013.

(51) Int. Cl.
| H01G 4/30 | (2006.01) |
| H01G 4/06 | (2006.01) |
| H02J 7/34 | (2006.01) |
| H02J 3/28 | (2006.01) |

(52) U.S. Cl.
CPC . *H01G 4/30* (2013.01); *H01G 4/06* (2013.01); *H02J 3/28* (2013.01); *H02J 7/345* (2013.01)

(58) Field of Classification Search
None
See application file for complete search history.

(56) References Cited

U.S. PATENT DOCUMENTS

| 5,576,925 | A | 11/1996 | Gorowitz et al. |
| 5,636,100 | A | 6/1997 | Zheng et al. |
| 5,638,251 | A | 6/1997 | Goel et al. |
| 5,774,326 | A | 6/1998 | McConnelee et al. |
| 5,790,368 | A | 8/1998 | Naito et al. |
| 5,844,770 | A | 12/1998 | Fries-Carr et al. |
| 5,926,359 | A | 7/1999 | Greco et al. |
| 7,023,089 | B1 | 4/2006 | Lu |
| 7,023,687 | B2 | 4/2006 | Sterzel et al. |
| 7,990,679 | B2 | 8/2011 | Ehrenberg et al. |
| 8,097,557 | B2 | 1/2012 | Bhise et al. |

(Continued)

FOREIGN PATENT DOCUMENTS

| JP | 1097834 C | 1/2003 |
| JP | 2005285968 A | 10/2005 |

(Continued)

OTHER PUBLICATIONS

European Patent Office—Supplementary Partial ESR—Date: Sep. 15, 2015—Application No. EP 12849600.7—Place of Search: Munich—Date of Completion of Search: Sep. 7, 2015.

(Continued)

*Primary Examiner* — Dion R Ferguson
(74) *Attorney, Agent, or Firm* — Pearne & Gordon LLP

(57) ABSTRACT

An energy storage device for providing electrical energy storage of high specific energy density for use in consumer and commercial devices and for storing power to be provided to an electrical power grid. An example of the energy storage device has a plurality of layers of high dielectric constant material, such as Barium Titanate or Hexagonal Barium Titanate, sandwiched between electrode layers made up of a variety of possible conducting materials. The example device includes additional insulating layers, such as Diamond-Like Carbon Coating, between the electrodes that provide for very high breakdown voltages.

20 Claims, 7 Drawing Sheets

(56) References Cited

U.S. PATENT DOCUMENTS

| | | |
|---|---|---|
| 8,214,508 B2 | 7/2012 | Masuoka |
| 8,259,432 B2 | 9/2012 | Sweeney et al. |
| 2004/0071944 A1 | 4/2004 | Weir et al. |
| 2006/0067033 A1 | 3/2006 | Mosley |
| 2006/0121349 A1 | 6/2006 | Chow et al. |
| 2007/0159767 A1 | 7/2007 | Jamison et al. |
| 2009/0090999 A1 | 4/2009 | Carver |
| 2009/0207555 A1 | 8/2009 | Hackenberger et al. |
| 2010/0097740 A1 | 4/2010 | Yamaguchi |
| 2010/0277852 A1 | 11/2010 | Kimock et al. |
| 2011/0051315 A1 | 3/2011 | Dogan |
| 2011/0059838 A1 | 3/2011 | Yono et al. |
| 2011/0085281 A1 | 4/2011 | Yamaguchi |
| 2011/0110015 A1 | 5/2011 | Zhang et al. |
| 2012/0039017 A1 | 2/2012 | Baron et al. |

FOREIGN PATENT DOCUMENTS

| | | |
|---|---|---|
| JP | 2008227093 A | 9/2008 |
| JP | 2009292671 A | 12/2009 |

OTHER PUBLICATIONS

PCT International Search Report; International Application No. PCT/US2012/064944; Applicant's Reference: Applicant: Martin A. Stuart et al; Date of Actual Completion of International Search: Mar. 22, 2013; Date of Mailing of International Search Report: Mar. 25, 2013; Authorized Officer: Han Cheol Joen.

State Intellectual Property Office Search Report; Application No. 2012800560568; 1st Search; Date of Search Completion; Mar. 27, 2016.

HIGH ENERGY DENSITY STORAGE DEVICE

CROSS-REFERENCES TO RELATED APPLICATIONS

This application is a continuation-in-part of U.S. application Ser. No. 14/357,676 filed on May 12, 2014, as a national stage application of PCT application serial number PCT/US2012/064944 filed on Nov. 14, 2012, which claims the benefit of priority to U.S. Provisional Patent Application No. 61/560,461 filed on Nov. 16, 2011, all of which are incorporated herein by reference. This application also claims priority from U.S. provisional application 61/906,965 filed on Nov. 21, 2013, which is incorporated herein by reference.

BACKGROUND

Capacitors are devices that store electrical energy on a dielectric material between two conductive electrodes, usually metal. Their architecture has followed a path that started as a metal sleeve on the outside and inside of a glass jar (called a Leyden Jar). Today, materials with very high dielectric constants are used in geometries that maximize the area of the electrodes while at the same time providing dielectric thicknesses that result in high breakdown voltages. The combination of high dielectric constant, high voltage, and high electrode surface area leads to an energy storage capability with very high specific energy (energy per unit volume).

Capacitors using dielectrics having very high dielectric constants (values near 20,000 or more) would prove useful in commercial and residential applications. One problem has been the fact that many high constant dielectric materials have a breakdown voltage which can severely limit the maximum allowed applied voltage to the device and thereby limit the amount of energy storage, limiting the utility of the resulting device.

SUMMARY

Examples of a new method and design is provided that inserts a thin layer of an electrically insulating material with a high breakdown voltage and very good heat conductivity between the electrode and the dielectric material. The insulating material, for example Diamond Like Carbon (DLC), can be deposited in thin layers by a number of different methods described below. The specific thicknesses and the method of deposition can vary depending upon the desired energy density and size of the final device.

In one example embodiment, the reliability of the device can be considerably improved over previous embodiments by encasing the $BaTiO_3$ in a low melting temperature glass (LMG), such as, but not limited to, Mitsui's 380C frit glass (U.S. Pat. No. 6,355,586 incorporated by reference), instead of PET. Then, a thin layer of Diamond Like Carbon (DLC) is deposited on both faces of the dielectric layer prior to applying a thin metal film. The DLC serves the function of increasing to a very high level the breakdown voltage of the sandwich (the breakdown voltage of DLC film can be 10,000 volts/micron assuming at least 70% is in the tetrahedral carbon structure, usually specified as $sp^3$ structure) while providing good heat conductivity. A safe voltage range is chosen, typically at about half the breakdown voltage.

The glass or ceramic can be sintered, fused or melted at a temperature below 400 C. This temperature limit is important since Diamond Like Carbon (DLC) can graphitize at or above this temperature. While the glass is soft, a high voltage is applied to orient the $BaTiO_3/Al_2O_3$ particles and the particles remain oriented as the structure cools.

Other embodiments using different electrode material, different layer thicknesses, and different voltages are possible, some of which are described below. The critical parameters for sizing the High Energy Density Storage Device are: 1) the breakdown voltage of the DLC insulation layers, 2) the maximum applied field allowed by the $BaTiO_3$ to keep its high dielectric constant, and 3) the maximum voltage (DC) that can be practically generated in the external power supply.

Provided is a device for storing energy, comprising: a first insulating layer comprising an electrically insulating material having at least good heat conductivity; a dielectric layer comprising particles dispersed in an electrically insulating material, the particles including $BaTiO_3$; a first conducting electrode layer; a second conducting electrode layer; and a second insulating layer comprising the electrically insulating material having at least good heat conductivity. The dielectric layer is provided between the first conducting electrode layer and the second conducting electrode layer.

Also provided is a device for storing energy, comprising: a plurality of insulating layers each comprising carbon at least partially organized in a diamond-like structure; a plurality of dielectric layers each comprising particles dispersed in an electrically insulating material, the particles including BaTiO3; and a plurality of conducting electrode layers. The plurality of conducting electrode layers are interleaved with the plurality of dielectric layers and the plurality of insulating layers to form an electric capacitor device adapted for storing energy obtained from an electrical voltage source connected to the device.

Further provided is a device for storing energy, comprising: a plurality of insulating layers each comprising carbon at least partially organized in a diamond-like structure acting as an electrical insulator and having at least good heat conducting properties; a plurality of dielectric layers including $BaTiO_3$; and a plurality of conducting electrode layers. The plurality of conducting electrode layers are interleaved with the plurality of dielectric layers and the plurality of insulating layers to form an electric capacitor device adapted for storing energy obtained from an electrical voltage source connected to the device.

Still further provided is a device for storing energy, comprising: a plurality of insulating layers comprising an electrically insulating material having at least good heat conductivity; a plurality of dielectric layers; and a plurality of conducting electrode layers. The plurality of conducting electrode layers are interleaved with the plurality of dielectric layers and the plurality of insulating layers to form an electric capacitor device adapted for storing energy obtained from an electrical voltage source connected to the device. Furthermore, the device is adapted for storing energy at an energy density of greater than 10 kilojoules per cubic centimeter.

Also provided is an energy storage device for storing electrical energy, comprising: a housing; a capacitor including a diamond or diamond-like material layer; and a voltage step-down component configured to step down the voltage of the capacitor for providing power to a battery powered device. Such an energy storage device as described in this section can be encased in the housing configured to replace one or more removable batteries for installation in the electric device.

Further provided is an energy storage device for storing energy, comprising: a housing and a capacitor, with the capacitor comprising a stack of: a first insulating layer comprising an electrically insulating material having at least good heat conductivity, a dielectric layer comprising particles dispersed in an electrically insulating material, the particles including BaTiO3, a first conducting electrode layer, a second conducting electrode layer; and a second insulating layer comprising the electrically insulating material having at least good heat conductivity.

The dielectric layer of such a device can be provided between the first conducting electrode layer and the second conducting electrode layer. Furthermore, a voltage step-down component configured to step down the voltage of the capacitor to provide power to an electric device can be included in the device.

The capacitor can be configured to connect to a voltage-converting component configured to convert a source voltage into a charge voltage to charge the capacitor; and the energy storage device can be encased in the housing configured for installation in the electric device.

Still further provided is an energy storage device for storing energy, comprising: a capacitor comprising a stack including:
 a first insulating layer comprising an electrically insulating material including carbon at least partially organized in a diamond-like structure, a dielectric layer comprising particles dispersed in an electrically insulating material, the particles including BaTiO3, a first conducting electrode layer, a second conducting electrode layer; and a second insulating layer comprising the electrically insulating material having at least good heat conductivity.

The dielectric layer can be provided between the first conducting electrode layer and the second conducting electrode layer; and a voltage step-down component can be configured to step down the voltage of the capacitor for providing for power to an electrical device. A voltage-converting component can be provided to convert a utility voltage to a charge voltage for charging the capacitor; and the energy storage device can be configured for installation in the electric device.

In addition is provided an energy storage system comprising: a plurality of capacitors, each capacitor comprising a plurality of stacks each including:
 a first insulating layer comprising an electrically insulating material including carbon at least partially organized in a diamond-like structure, a dielectric layer comprising particles dispersed in an electrically insulating material, the particles including BaTiO3, a first conducting electrode layer, a second conducting electrode layer; and a second insulating layer comprising the electrically insulating material having at least good heat conductivity.

A dielectric layer can be provided between the first conducting electrode layer and the second conducting electrode layer; a voltage inverting component to convert the output voltage of the plurality of capacitors into an AC voltage for connecting to an electric power grid to provide electrical power to the electric power grid, and a voltage converting component to convert the voltage of a power source to a voltage for charging the plurality of capacitors, wherein each one of the plurality of capacitors outputs energy at a voltage of more than 1000 volts.

Further provided is an energy storage system, such as disclosed herein, using electrically insulating material which includes diamond or diamond-like carbon. Also provided is any of the above energy storage systems or storage devices, wherein dielectric particles are dispersed in electrically insulating material and the particles include BaTiO$_3$.

Also provided are devices and systems with additional combinations and arrangements of the above features, along with additional example embodiments, some, but not all of which, are described hereinbelow in more detail.

BRIEF DESCRIPTION OF THE DRAWINGS

For a fuller understanding of the disclosed features, reference should be made to the following detailed description taken in conjunction with the accompanying drawings.

DETAILED DESCRIPTION OF EXAMPLE EMBODIMENTS

Note that throughout this document, the term DLC is used to describe diamond-like carbon, a material that may come in various forms, all comprising carbon that displays properties similar to those of diamond, like hardness giving good wear properties, slickness, and that can have high electrical insulation capability, while also having good to excellent heat conducting capability, such as the thermal conductivities in the range of metals (in the tens to many hundreds of W/m-K), to the excellent thermal conductivity of pure diamond (around 1000 W/m-K). Furthermore, some forms of DLC may even have semiconductor properties. This DLC material typically includes carbon at least partially organized in a diamond-like structure, and may contain significant amounts of sp$^a$ hybridized carbon atoms. Unlike pure diamond, DLC materials can be made flexible and amorphous. In some of its forms, DLC material may contain actual synthetic diamond material. For the purposes of this disclosure, DLC formulations are preferred that offer high electrical insulating capabilities while also having good to excellent heat conducting capabilities. Other materials having similar properties, such as diamond composites and diamond powders, among others (such as specialized polymers or ceramics that may include diamond-like or actual diamond materials), could be substituted for the DLC material described below.

Figure 1:
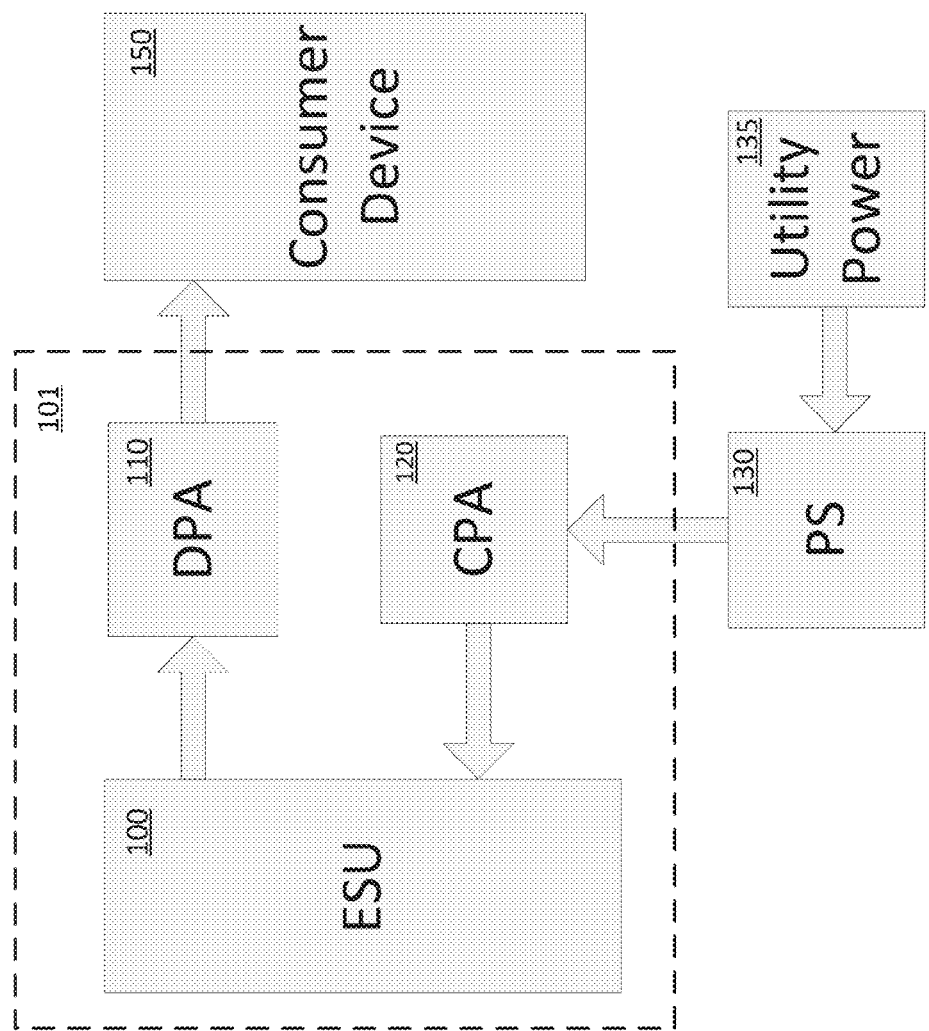
FIG. 1 shows a block diagram of an example application for an example energy storage unit (ESU) such as shown in FIG. 6.
Figure 7:
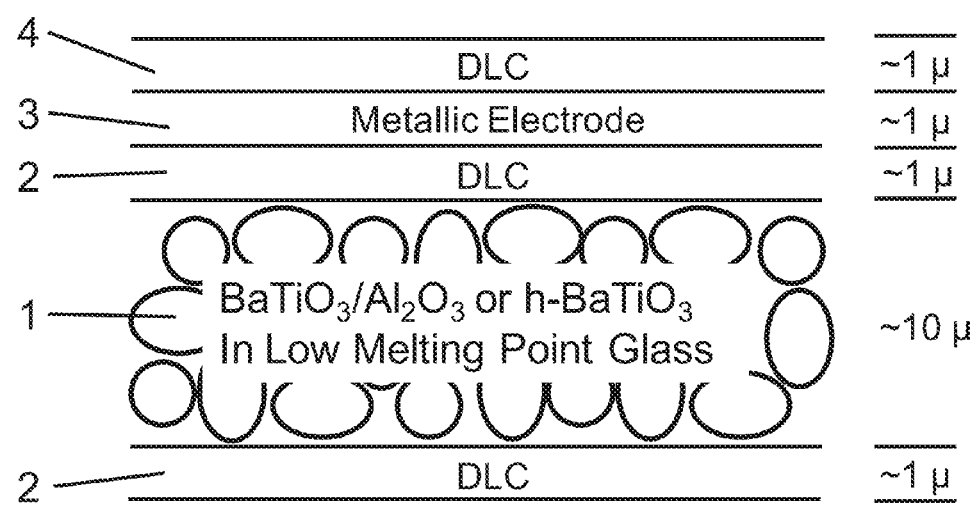
FIG. 7 shows a schematic of an example sandwich structure of the BaTiO$_3$/Al$_2$O$_3$ or h-BaTiO$_3$ particles in a low melting point glass between layers of Diamond Like Carbon (DLC) with single electrode.

FIG. 7 shows a schematic of the layered structure of an example storage unit (ESU) such as described in U.S. patent application Ser. No. 14/357,676, incorporated herein by reference. This ESU has a BaTiO$_3$ layer structure 1 with BaTiO$_3$/Al$_2$O$_3$ or h-BaTiO$_3$ particles dispersed in an insulating matrix, such as a low melting point glass (where h-BaTiO$_3$ is in the hexagonal structure and has higher dielectric properties than the more common cubic structure). The $BaTiO_3$ layer 1 is coated on top and bottom by a layer 2 of DLC. A metal electrode 3 is deposited on the top DLC layer 2. Multiples of the layers shown in FIG. 1 are sandwiched together in the final storage device as desired to obtain the preferred storage capacity (see, e.g., FIG. 8 and accompanying discussion). The outermost metal electrode layer 3 is coated with an external DLC layer 4 to electrically insulate the storage device. The thicknesses of the layers can be varied as needed, and thus illustrate only one embodiment of this device, in particular where the applied voltages are limited to be below 20,000 volts. This limitation is set by the thickness of the DLC layers between electrodes. By varying the thickness of the DLC layers between the electrodes, the limiting voltage can be changed up or down, with increasing voltages leading to thicker DLC layers.

Although Aluminum particles for the electrode can be used, the current carrying capacity of the metal electrode film can be increased for applications with rapid charge/discharge cycles by adding or exclusively using Molybdenum, especially where the film thickness is critical, since Molybdenum has a very low expansion coefficient. In a large cross section device, this would be desirable to reduce the effect of expansion in the metal of the electrode. Alternatively, an alloy of Ni and Fe can be used to match the expansion coefficient of the Low Melting Point glass and/or the DLC by altering the ratio of Ni to Fe to obtain the desired result. Since the entire device can be encapsulated in DLC or another sealing coating, the electrode can be protected from the effects of oxidation that otherwise might preclude the use of such an alloy.

Another alternative candidate for the metal electrode would be to use a coating of copper onto the DLC coated $h-BaTiO_3$ layer, at an elevated temperature up to 400 C. If processed at this temperature, the copper layer upon cool down to ambient temperatures would contract. This permits the use of metal with higher expansion ratios than the composite of $h-BaTiO_3$/DLC layer. This method would permit the use of lower cost metals within the storage device, because the higher Coefficient of Thermal Expansion (CTE) metal would shrink within a cavity inside the DLC encapsulation mentioned. This is an expansion contraction fabrication method. Additionally this method relies on the DLC releasing from the metal it encapsulates. To facilitate this effect there may be an atom-thick release layer similar to, but reverse from, the ZnO layer discussed in the cited U.S. application to facilitate hexagonal crystal formation.

Another alternative for the metal electrode is to use a commercial variation of 430 stainless steel as a substrate which can be obtained at 1 mil thickness (without a custom fixture) or less (with holding fixture). This material in foil form would permit roll-to-roll fabrication as the Coefficient of Thermal Expansion (CTE) is close to that of the $h-BaTiO_3$ dielectric. In this case, the $BaTiO_3$ would be deposited and grown in the $h-BaTiO_3$ form via a suitable hexagonal seed layer, such as Zinc Oxide. This would be followed by a heat and cool down at a proscribed rate. This process would have the advantage of allowing for a more robust metal, during set up, in the roll-to-roll coater. Alternatively, if desired, Titanium or Molybdenum foil could be used in this arrangement as well.

The electrodes of the full device are typically interleaved, with alternating electrode layers connected to opposite ends of the device (as shown in related cited U.S. application). One advantage of this construction with layers of DLC is that the very high heat conductivity of diamond will allow the residual heat load in the device to be conducted efficiently to the sides (90 degrees from the electrode ends) where it can be removed by any number of heat transfer methods. For example, assuming two-1 micron DLC layers adjacent to a 10 micron $h-BaTiO_3$ or $BaTiO_3$—$Al_2O_3$ particle layer, and a 1 micron thick electrode layer as shown in FIG. 7, the cross section of the side of the device would have a 15% surface area of DLC for conducting heat.

While specific film thicknesses are shown in the figure, they are merely illustrative of the various choices a designer could make. The thickness of the DLC layer is related to the maximum desired voltage of the device. Lower voltages would permit the choice of thinner DLC layers, and, indeed, any of the layers could be changed by the designer to tailor a device for specific tasks and applications. For fabrication of thick DLC layers, trace amounts of various metals, such as Titanium, Tungsten, Cobalt, or various others mixed with carbon in low percentages, can be used to create a stress relieve layer. Additionally, lowering the radiance levels of the laser on the pure carbon target will create $sp^2$ (graphite) layers, which are also stress relief layers. Stress relief is desired for thick layers to prevent cracking.

The manufacture of these layered storage devices can be accomplished via the use of several standard technologies. The preferred method is high speed Pulsed Laser Deposition (PLD), which can be accomplished in a roll-to-roll coater. Magnetron sputtering in a roll-to-roll Chemical Vapor Deposition (CVD) coater would also be a viable method, as would planar CVD, reactive CVD or Plasma Assisted Chemical Vapor Deposition (PACVD). These deposition methods are existing art and are used for other applications, but can be applied to manufacture the disclosed devices.

When using PLD to manufacture the device, any of several pulsed lasers can be used. These include the Neodymium doped Yttrium Aluminum Garnet (NdYAG), the Neodymium doped Yttrium Vanadate ($Nd:YbVO_4$), the Chromium doped Alexandrite ($Cr:BeAl_2O_4$), or the Titanium doped Sapphire lasers. Other lasers can also be used, in particular if they are pulsed and have high power density in the focused spot. For high growth rates, this process best utilizes lasers exhibiting both high radiance per pulse and high average power. Lasers in this class are usually considered military systems. The laser is focused on a high purity carbon target with an energy density in the range $10^8$ to $10^{10}$ (or more) Watts per square centimeter. This energy density is desired to create a plume of single carbon ions (lower energies tend to create clusters or strings of carbon atoms). The desired pulse width would be in the range of tens of nanoseconds, which is a usual pulse length for Q-switched lasers (or down to the picosecond range if they are mode locked). The pulse repetition rate will be function of which laser gain material is actually used, and is usually in the range of several to several tens of kilohertz for the Q-switched systems. This method is existing art, although the growth rate for the DLC is fairly slow. A Laser such as disclosed in PCT application PCT/US12/64944, incorporated herein by reference might also be used.

Several methods are proposed herein to increase the growth rate and the quality of the Diamond Like Carbon surface. At high PLD growth rates, one of the problems is that clusters of carbon atoms that are not in the $sp^3$ diamond structure impinge on the substrate. To improve the quality and rate of growth of the PLD films, the carbon plume is confined and directed to the substrate by several possible methods, the simplest of which is electrostatically charged baffles or electrodes. Additional methods would include using a quadrupole antenna or radio frequency (RF) antenna. The use of RF frequency (for example in the Microwave frequency range to couple to the carbon-carbon bond) can both serve to focus the beam and to break up any clumps of carbon atoms within the ejected material. A third alternate method is to use a portion of the laser beam in a second beam path to irradiate the plume in flight. This second beam can be at the primary frequency or at a harmonically converted frequency (or combination of both) of the source laser.

In the architecture described in FIG. 7, a completed envisioned device could have many different numbers of layers, including the use of 10,000 or more layers per foot of height, with the length, from centerline assumed, but not limited to, 6 inches and the width from heat sink to heat sink assumed, but not limited to, 1.5 inches. Such a device would have very high energy density. For example, with a dielectric constant for $BaTiO_3$ of 160,000 as reported for one composition compared to 20,000 reported for another composition, and an applied voltage of 5,000 volts, the device will hold up to $\sim 2.8 \times 10^9$ Joules (this is ~3 Gigajoules or about 775 kilowatt-hours) of energy in a cubic foot of material.

ESU devices such as described above, and other embodiments, including but not limited to other examples disclosed in the cited related U.S. patent application, can be useful for a number of power providing applications through their incorporation into rechargeable power devices, as is described hereinbelow.

Example Consumer Device Power Adaptor Design

FIG. 1 shows a simple block diagram of an arrangement of an integrated rechargeable power device (IRPD) 101 which comprises an ESU 100 connected to a Discharge Power Adaptor (DPA) 110 for converting the output voltage of the ESU into a voltage that can be used by an electrical device. Typically, the DPA will act as a voltage step-down device to convert the higher ESU storage voltage (which may run from dozens to hundreds of volts) to a lower voltage (typically a DC voltage) for use by the Consumer Device 150 (such as tablet computer, cell phone, laptop, electric toy, flashlight, power tool, etc.). The ESU 100 can be a properly sized ESU device constructed as discussed above, and in more detail in related U.S. patent application Ser. No. 14/357,676 incorporated herein by reference.

A Charging Power Adaptor (CPA) 120 can be provided as a voltage conversion component that converts power from utility power 135 or a power supply 130 connected to the utility power source 135 (e.g., 110 VAC) to an acceptable DC voltage to charge ESU 100. The CPA 120 might also convert a DC voltage provided by the Power Supply (PS) 130 into an acceptable voltage (typically by step-up). The voltage supplied by the CPA 120 may be in the dozens or hundreds of volts in some applications, which may be converted from utility line voltages or commonly used DC voltages such as 24 VDC, 12 VDC, 9 VDC, or 6 VDC, or AC voltages of desired values, as provided by the Power Supply (PS) 130. Alternatively, the PS 130 may be incorporated into the internal CPA 120, or the CPA 120 may be incorporated into the external PS 130 to provide a single device that converts the utility power 135 into the voltage and current for charging the ESU 100.

Typically, the CPA and PS, in combination, work to convert the utility line voltage (e.g., 110~120 VAC) to the proper DC voltage to charge the ESU (typically dozens to hundreds of volts). Hence, this may require either stepping down, or stepping up, the line voltage and it will also require rectifying the voltage into direct current. Accordingly, it may be desirable to avoid the use of DC-to-DC conversion in this process in some cases, and instead convert the AC voltage to a desired voltage (e.g., using a transformer), and then rectifying the resulting voltage into direct current. However, in some cases it may be preferred to use a DC-to-DC converter to change the voltage levels when DC power sources of sufficient current capacity are provided.

Note that since a capacitor can draw substantial currents when a high voltage is applied to a discharged capacitor, the CPA may be designed to ramp up the voltage in a controlled way (e.g., using a voltage or current regulator) to avoid high spike currents.

One option is to avoid incorporating a CPA into the IRPD device itself, but instead provide a direct external connection to the ESU for charging the IRPD using an external charger that incorporates the PS and CPA, and provides a charging voltage to the IRPD at the ESU DC operating voltage (which may be current controlled to avoid current spikes). However, when the ESU operates at higher voltages, it would be desirable to avoid exposing the ESU voltage outside of the IRPD to avoid personal injury or damage to external devices, and hence a mechanism to avoid such access is desirable, such as by mechanical means of protecting any electrodes from exposure when not being charged (e.g., by withdrawing or covering the electrodes), or by only allowing currents to flow into the device, but not out of the device (e.g., using diode protection), or by using some type of fault detector.

The PS 130 and CPA 120 components could be provided to be able to operate at much higher currents than is typical for consumer recharging power supplies in order to quickly charge the ESU 100 in seconds or minutes rather than the traditional hours. Power supply 130, which may be a conventional power supply, may be internal to device 150, it may be provided as part of the IRPD 101, or it may be an external power supply that is connected to the utility power.

The ESU 100, DPA 110, and CPA 120 may all be fabricated into the integrated rechargeable power device 101 as a unit packaged such for installation in the Device 150, and hence device 101 can be designed to be of a form-factor to replace a standard size battery in an existing device, thereby acting as an after-market replacement for consumer or commercial device batteries, but with larger storage capacities and potentially faster recharge rates. In some cases, the power supply 130 could be incorporated into the device 101. The device 101 might also have all components fabricated on a single wafer as described in more detail below.

Figure 2:
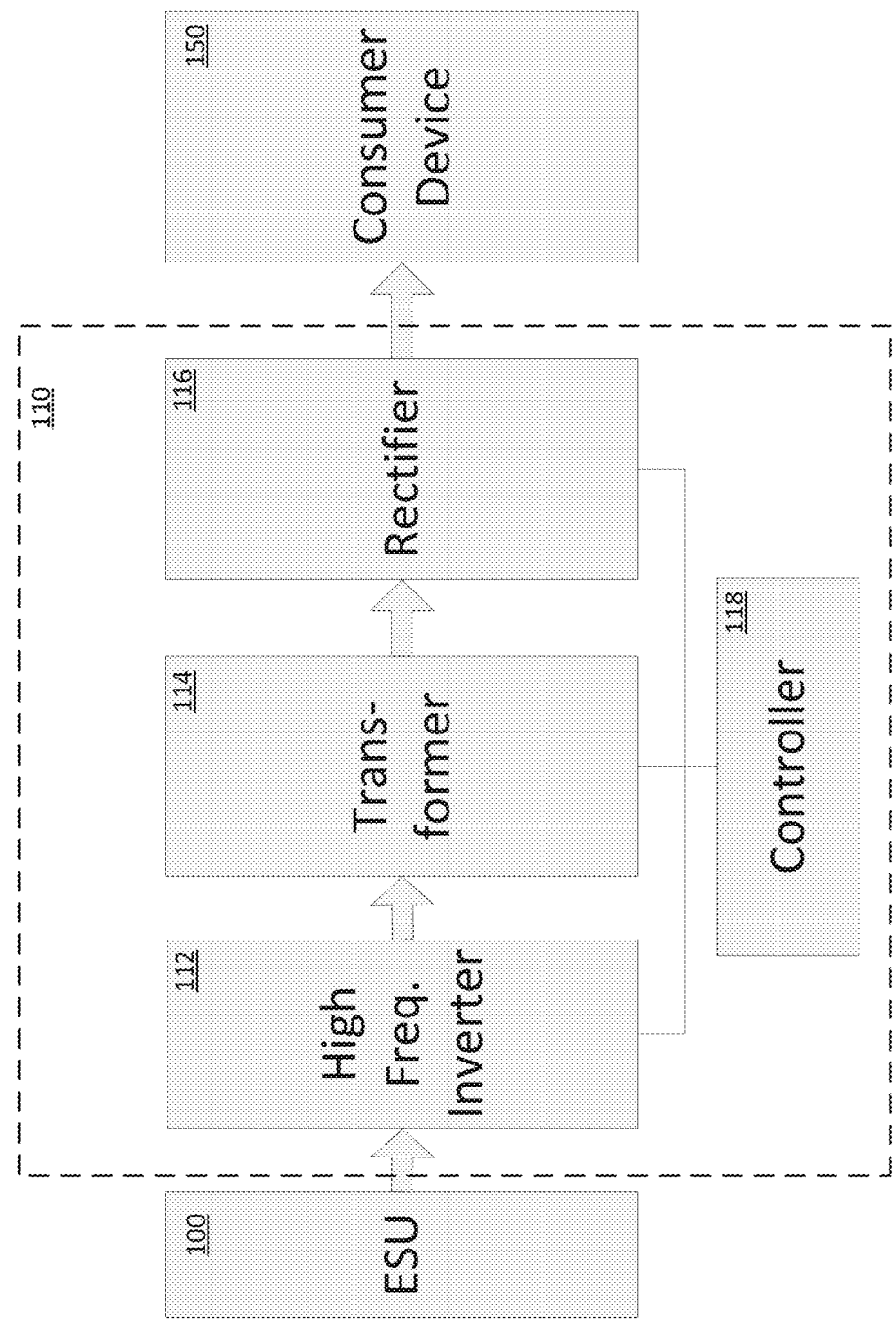
FIG. 2 shows a block diagram of an example Discharge power adapter as used in the Example of FIG. 1.

The DPA 110 and the CPA 120 are voltage converting devices for connecting the ESU to a consumer device, and a source voltage respectively. The DPA 110 can utilize a DC-to-DC converter of mostly conventional design, but one that matches the ESU voltage (likely a few dozen to a few hundred volts) to the desired consumer device 150 voltage of less than 50 volts (typically 3V, 6V, 9V, or 12V in many consumer devices, or higher voltages in some commercial devices such as power tools such as 14V or 18V, for example). Hence, the DPA is generally designed to step down the voltage by more than an order of magnitude from the ESU voltage, which may run into the hundreds of volts for very energy dense devices. As shown in FIG. 2, DPA 110 might utilize a high-frequency inverter 112, a transformer 114, and a rectifier 116 to rectify the output of the transformer 114 into a DC voltage, all to convert the ESU 100 relatively high voltage (~500V) to a low voltage (~3.5V) for the device 150. A controller 118 can be provided to control the DPA components and monitor the operation of the device, where desired.

The CPA 120 (Or the PS 130) might similarly utilize a DC-to-DC converter, in particular in situations where a conventional power supply is used to charge the device 101. In some cases, the PS 130 may be merely a step down or step up transformer, with the CPA 120 acting as a rectifier and voltage controller. Hence, where a customized power supply can be utilized, that power supply 130 could be designed to provide an intermediate AC voltage, such as 25 VAC to the CPA 120, in which case the CPA 120 might not need to utilize an inverter or converter, in particular where the power supply 130 can supply a high-frequency AC signal.

In some cases, the DAP 110 and the CPA 120 may be incorporated into a single circuit design, so that common components of the charge/discharge functions may be utilized, where practical, for both functions. In such a situation, a controller would likely be incorporated into the unified design in order to control whether a charge or a discharge function were to be implemented at any given time. This can aid in miniaturization of the device 101. But generally, because the ESU 100 tends to store a voltage in the hundreds of volts, voltage conversion will be necessary both to charge the unit, and to use the unit to power the consumer device.

Power adaptor design concepts for the device 101 can utilize a DLC substrate (e.g., a disc, for the cylindrical products, but any desired shape can be utilized) with PLD grown coil traces which can comprise, for example, essentially a very compact class D oscillator (for example, using a transistor that switches on ¼ of the wave cycle into primary coil, then it rings the other ¾ cycle and fires again on a clock cycle) with step down coils adjacent to, but insulated from, via a DLC layer, the first coil followed by surface mounted diodes to make a bridge rectifier also followed by another wafer or cylindrical section made up of a roll up or monolithic capacitor material. This can be formed and made to fit in the cores of, for example, AAAA, AAA, AA, C, or D cell devices, among others, as well as next to the ESU section on a rectangular cell phone, tablet or laptop battery sized devices to replace the original device batteries.

In cases where the concept is expanded to accommodate a larger central processor, the architecture of FIG. 2 could be unchanged, even if the processor was the most significant part of this device. This feature would be expected to expand vertically where each layer of DLC substrate were to have one or more processor chips hosted or embedded in the individual DLC layer. The exception would be where this architecture is paralleled even further by virtue of fabricating the actual integrated circuit made from Diamond like carbon semiconductors. The fabrication would include but not be limited to conventional Silicon, Germanium Gallium Nitride and other semiconductors including integrated optical interconnects and ultimately all optical integrated circuits.

In contrast, larger battery powered devices would likely use an IRPD made of discrete components. Power tool batteries such as NiCad or other such battery operated devices could be replaced with such devices. Similarly, lead acid batteries such as vehicle batteries could be replaced with an appropriately sized device.

Example Device Applications

A specific architecture concept is provided that facilitates a flexible high energy density Energy Storage Unit (ESU), film stack on foil or base plate structure which can be coiled, or cut and stacked into cylindrical form factors, using a further modification of the ESU device having a DLC (diamond-like carbon) layer as disclosed in U.S. patent application Ser. No. 14/357,676, incorporated herein by reference. Such ESU devices can be fabricated using Pulse Laser Deposition such as by using an embodiment of the Slab LASER and amplifier disclosed in PCT application PCT/US12/64944, incorporated herein by reference.

Figure 3:
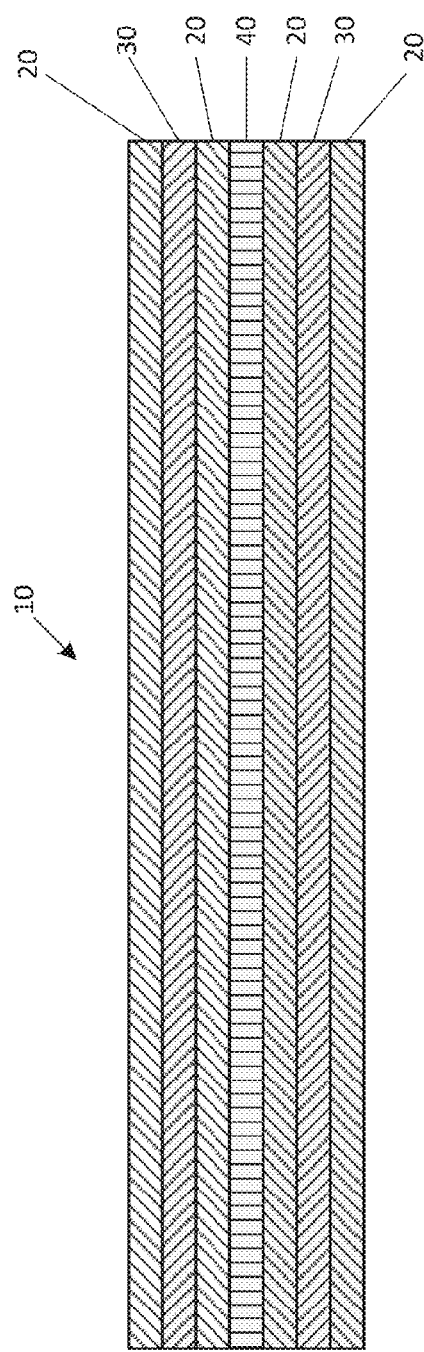
FIG. 3 shows a schematic of an example layer stack that can be used in an ESU.

FIG. 3 shows an example of such a film 10, using PLC layers 20, conductor layers 30, and dielectric layer 40. Other arrangements of the layers might be utilized, such as putting an additional dielectric layer 40 over an outer PLC layer 20, or leaving out an outer PLC layer 20, for example. The film 10 can be arranged by coiling or spiraling the film to form a cylinder such as shown in FIG. 4A, or stacking the layers as is shown in FIG. 4B to form a rectangular structure.

Figure 4C:
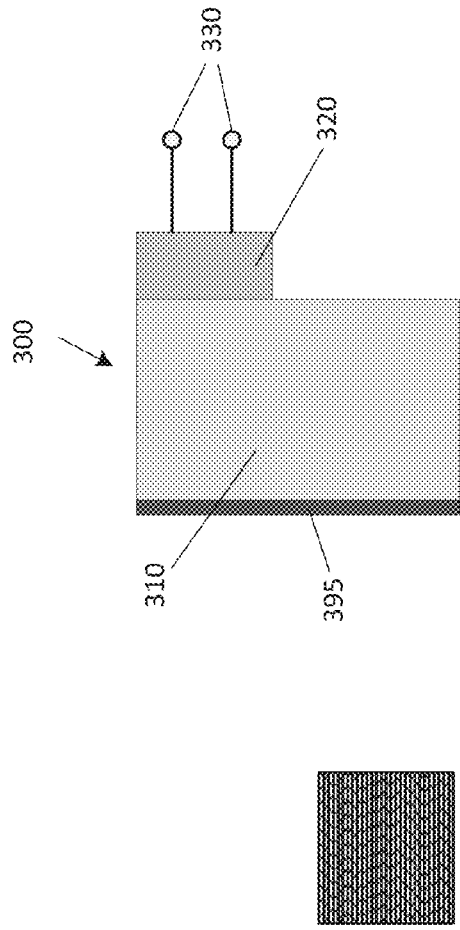
FIG. 4C shows a schematic of an integrated structure including an ESU with an integrated power adaptor and input/output leads grown on a common substrate.
Figure 4B:
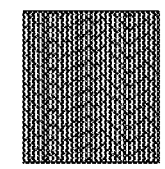
FIG. 4B shows a schematic of a rectangular structure that can use the example layer stack of FIG. 3 in an example ESU.
Figure 4A:
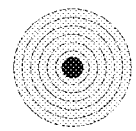
FIG. 4A shows a schematic of a cylindrical structure that can use the example layer stack of FIG. 3 in an example ESU.
Figure 5A:
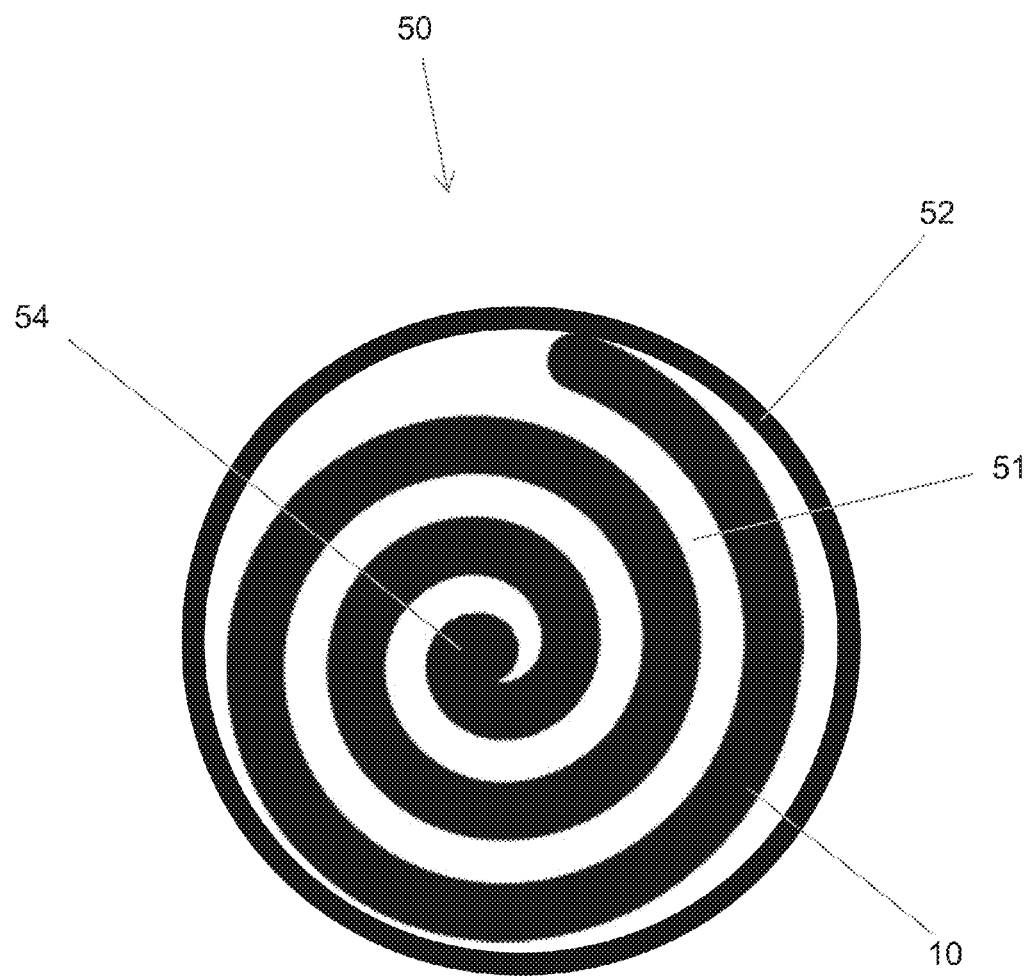
FIG. 5A shows a schematic of an ESU having a spiral layer structure to form a replaceable power source.

For example, FIG. 5A shows a cross section of a cylindrical device 50 with the film 10 coiled around a core 54 and covered with an outer case 52. The space 51 between the film 10 would be preferably minimized to reduce the size of the device and to increase its energy density, and this space might be utilized for electrode or insulator placement, for example. Rather than coiling the film 10 into a spiral, concentric layers of film 10 might be used instead, such as shown in FIG. 4A, or a stack such as shown in FIG. 4B can be used to form a rectangular device, for example.

Figure 5B:
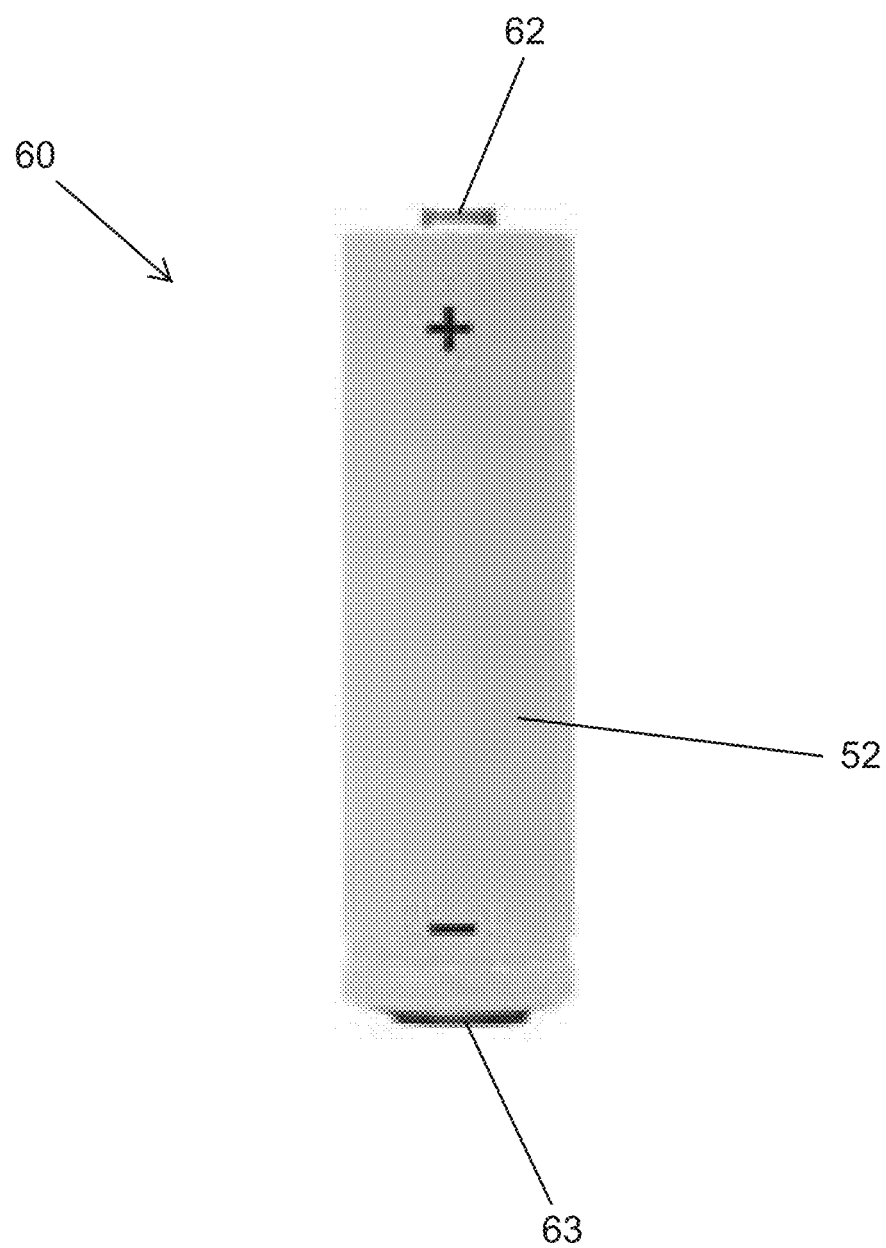
FIG. 5B shows a diagram of an ESU formed into a cylindrical structure having a battery form factor.

FIG. 5B shows a perspective view of an example battery replacement device 60 that could use the coil structure of FIG. 5A or 4A, including one or more power adaptors (such as described above, for example) provided internally, and with terminals 62, 63 representing the terminals of a conventional battery. Internally (not shown), the power adaptor will connect with at least a pair of conductor layers of the capacitor. The power adaptor will then connect externally or through the outer case 52 to the terminals 62, 63 to connect to the device being powered and/or a charging power supply via terminals 62, 63, as in a conventional alkaline consumer battery, for example.

Optionally, with a stacked interleaved structure grown via PLD on a base plate or cylinder form, such structure permits the active layers to be grown in infinite repetition to an arbitrary thickness. This permits nano-layered monolithic block type structures with repeating design structures to be grown from the base up. If the repetitive structure is grown continuously along one axis such as the height, to a specific arbitrary thickness that is not flexible, another option of the monolithic construction can also be grown on a cylindrical or cylinder sections permitting a hollow form or tube or alternately a flat rectangular structure. This permits an exact dimensioned hollow cored structure of the monolithic design that would permit, optionally, a voltage and current regulating power adaptor within the inner hollow core or next to the rectangular monolithic structure.

Both flexible and non-flexible monolithic architectures of this type can have lower specific energy density than the other embodiments previously described as a function of the base plate volume to active device volume. The base design is to use 0.001 inch thick very low Coefficient of Thermal Expansion (CTE) alloy foil or tube, upon which a layer of down to a 0.0001μ (0.1-200 nm or about 1 carbon atom) thick (PLD) DLC layer-on all sides-then a metal electrode contact layer with a thin DLC layer covering a center base insulator strip layer upon which a thicker but similar PLD grown h-BaTiO3 layer is grown. Such that the dielectric is grown on only one side of the previous layer, and that this layer is not as wide as the DLC insulating sub-layer. However, it is one that is ten times thicker than the DLC layer, for a specific design voltage and hence architecture. The design parameter is that the voltage gradient upon the dielectric layer be 500 VDC per micron or more.

The layers are again a base material in this case low CTE foil, an enclosed contiguous DLC layer, positive electrode layer #1, a DLC insulating layer, h-BaTiO3 or dielectric, an encapsulating DLC layer, a negative electrode layer #2. This is the base architecture for one nano layer ESU element. At minimum voltage and thickness, this stacked structure would be approximately 1μ thick with about 26 repeating layers within, which would constitute a combined stack layer about 0.001 inch thick. This constitutes a representative concept for the flexible version for producing cylindrical or conforming form factors of the ESU.

The described versions of this design are provided to be flexible or form factor fitting and have as a feature the nano layered interleaved uncoated 1 mm or so contact edges on opposed terminating sides or edges of the foil architecture, each exposed edge is a common contact for the cumulative nano layer interleaved electrodes of the thin film version or monolithic architecture.

The coated thin foil structure can be formed or rolled up as long as the bend radius of curvature is not tighter than one which would crack the DLC layers or approximately 300 times the thickness of the active interleaved layer The thinner flexible h-BaTiO3 layers would represent less of the volume of the device, due to this embodiment having one half its volume being the substrate foil. However it would still represent a capacity of approximately 388 kWhr/ft$^3$ of coated flexible foil device volume vs. the 775 kWhr/ft$^3$ figure of the active volume flat pack modules. This is 57-115 times the capacity or energy density of Lithium Ion Batteries. However the device described would run at up to 50 volts. This then would utilize a power adapter to convert to standard consumer device voltages such as 3.3 volts, for example.

For utilizing large ESU versions for high-power application, larger power adapters can be utilized to operate at 125-250 kV. The extensive use of DLC as an insulator-heat management system and substrate it utilized to shrink the macroscopic size of small watt to megawatt sized power supplies by several hundred times.

Figure 6:
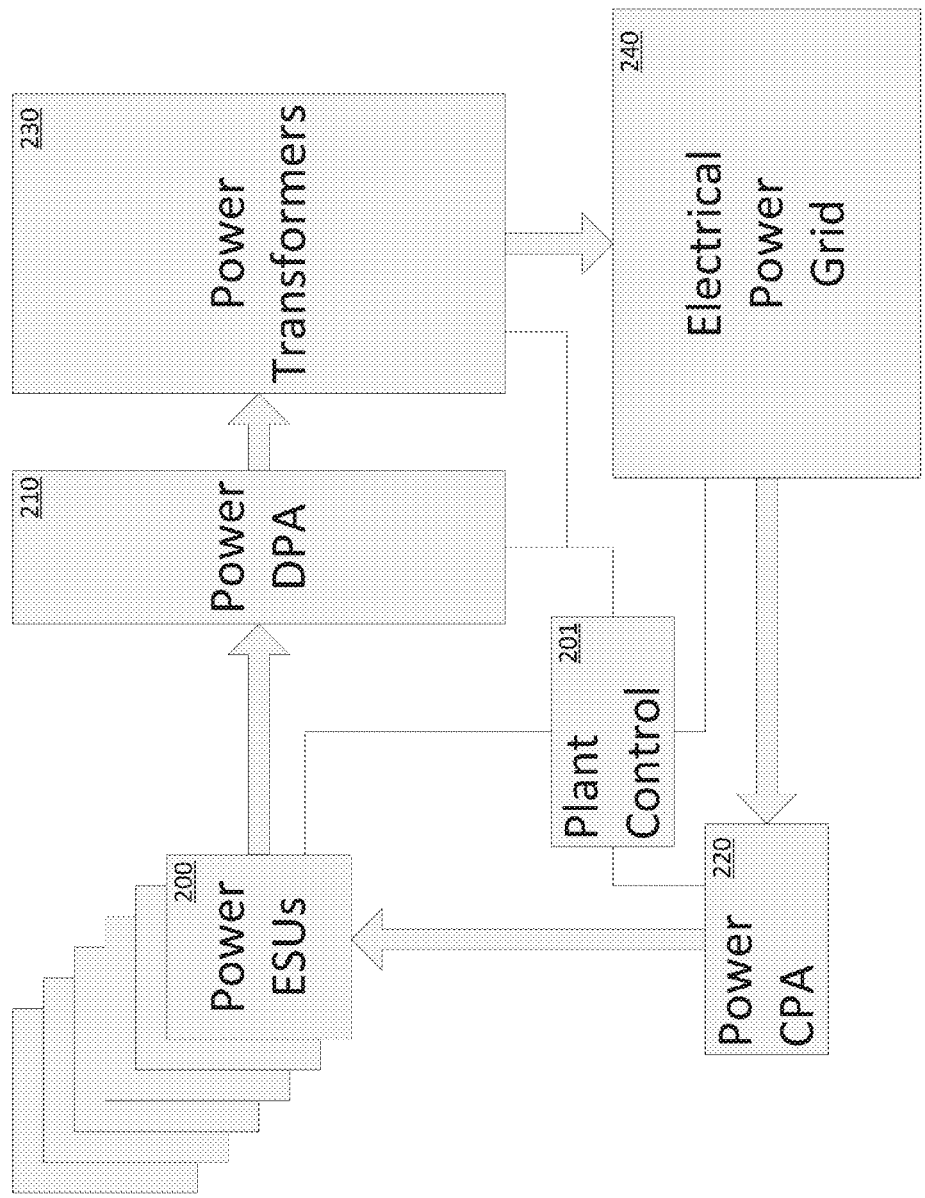
FIG. 6 shows a block diagram of an example use of ESUs to store electrical power for connecting to an electrical power grid.

For example, FIG. 6 shows one example embodiment of a system employing a plurality Power ESUs 200 to provide power to an Electrical Power Grid 240 such as might provide power to a factory or town. The Power ESUs 200 are connected to one or more Power DPAs 210 to convert the DC stored voltage in the ESUs 200 into an AC voltage at a desired power transmission frequency (e.g., 60 Hz) for converting to the desired output voltage using Power Transformers 230 to match the Electrical Power Grid 240. Note that the Power DPA may or may not also utilize transformers to adjust voltages, depending on the particular application. A Power CPA 220 is provided to charge the Power ESUs. In some cases, the Power DPA and the Power CPA may be integrated into a single device, or they may share components, such as transformers, for example. In other cases, the Power CPA 220 may obtain power for charging the ESUs 200 from off the Grid 240, as in cases where the plant is located at or near a power generation station, for example. The ESUs of this example may store energy at voltages of many hundreds or in more practical systems, even many thousands of volts, due to the high voltage densities made available by the new ESU designs.

Such systems can be used to store power at wind or solar energy farms, or geothermal or hydropower generation locations. Such systems may also be used to store energy for emergency backup purposes, for example.

Example PLD Fabrication Process

A design architecture for automated fabrication of an integrated ESU with power adaptors can be provided utilizing a PLD slab coater and or Ultra-fast slab laser milling for via channels and mesas, using a Slab Laser coater design based on the slab laser disclosed in PCT/US13/53166 and incorporated herein by reference. Such an arrangement will facilitate making PLD grown Diamond Like Carbon (DLC) and or Reactive Silicon Carbide (RSiC) substrates and component features, such that discrete components can be mounted on, or composite complimentary thin film discrete electronic devices constructed of, doped carbon semiconductors or CMOs or Gallium Nitrides including semiconductors in recesses or grown on or in layers of same.

For example, a structure as shown in FIG. 4C can be fabricated such that a storage device 300 is comprised of an ESU 310 with an integrated power adaptor 320 with input/output leads 330 grown on a common substrate 395.

A Pulsed Laser Deposition (PLD) grown Diamond Like Carbon (DLC) wafer utilizing Ultra-Fast (sub Pico second), Q switched (250 Nanosecond to 0.05 Pico second) or both laser carved channels and features carved or vaporized into its surface can be used.

This architecture leverages high speed Pulsed Laser Deposition for additive manufacturing and Pulsed Laser Vaporization utilizing Ultra-fast or Q-switched Pulse lengths for additive and/or subtractive manufacturing.

It also employs molded carbon-binder paste which is reacted with stoichiometric amounts of silicon into Silicon Carbide substrate packages for high power density packaging and cooling of micro circuit VLSI and Nano Power devices and control systems. Alternately, these materials along with others can be grown with PLD into electronic and structural support devices and 3D substrates.

Subsequent processes are PLD grown discreet component or thin film growth fabrication or pick and place bump solder landing pads or Pulsed Laser vaporized—milled pockets for complimentary discrete components. This is employed as a feature so as to facilitate heat-generating components being subsurface or pocket mounted such that, for example, the height of the component can be made equal to the pocket depth. This allows the heat generating component to be conductively cooled and electrically insulated, by the use of DLC on five side unless the final layer is a cover layer of DLC (which is grown on powdered and packed DLC packing made from process overspray which is subsequently collected and processed into powder for this use) in which case all six sides can be used to cool the heat generating component.

This powder packing process permits a conductively cooled electrically insulating close grained materiel to form fit an arbitrary shaped component or structure, such that gaps are bridged, upon which a solid contiguous layer of DLC can be grown with which to encapsulate the structure or component.

The traces for transformer windings are pancake spirals whether singular as in inductors and resonators or stacked in plurality to form step up or down voltage ratio transformers, which are connected by via channels and island trace pads to other mesas or pockets for GaN HEMT or DLC semiconductor switching elements such as doped diamond semiconductor transistors and diodes, or combined into microprocessors. Alternately, for high voltage use switches, such as series connected switch elements including Graphene or copper or Moly PLD wires can be deposited in PLD solid grown features or powders backfilled into via channels with subsequent cover layer for encapsulation with DLC. The traces can be fabricated by shadowing or utilizing a "mask" made with Moly foil or another appropriate material as a mask as well during the growth process.

DLC/Graphene DLC, Schottky diodes and FETs, HEMT or IGBT transistors can be grown on the DLC or RSiC wafer sub mount. Both sides of the wafer or layer are populated with high side/low side voltages for isolation and encapsulation to permit isolation of input to output.

The DLC wafer sub mount is a high voltage insulator (up to 10 kV/u) and a high thermal conductivity (5× copper) substrate that is convenient and inexpensive to make on the high power PLD slab laser coater.

For example, PLD growth rates of about 1610 cc per MW of PLD laser power per hour can be achieved. This would yield 16,100 cm^2 at 1 mm thickness production of layers. O&M costs for a 1 MW PLD coater system should be cost effective.

The DLC wafer is also easy to hold for step by step or stage by stage processing to achieve the goal of a fully automated PLD with pick and place discrete components, or grown in place Integrated circuit components making the final product.

The trace channels for circuit connections or transformer windings carved by Ultra-Fast or Q switched laser pulse vaporization milling are then PLD filled with designer chosen metals or graphite & metal composites. The heat generated on the wafer, will be conducted away by the DLC permitting the traces to be smaller than typical, saving money for materials, particularly if graphite and or Graphene is used as the wire trace material thus resulting in a smaller form factor device.

Another feature is nano structured magnetic permeability materials that can be used as a tape or smaller wafer deposited in a pocket for improved transformer performance if needed. This can be mounted in a space between two thinner wafers to hold and cool the magnetic material. One example of which would be Moly Core mixture for operating at 500 kHz at high efficiency.

This DLC wafer circuit and component encapsulation architecture, would also allow control circuit fabrication in which discreet components are mounted and encapsulated as a die, so as to permit mounting on convenient locations on larger or higher voltage or higher power adaptors such as would be used in injectable nano-manipulation and sensing medical devices to micro robotic vehicles, extending the concept to transportation and or Utility grid power systems up to an including utility and micro grid systems.

The predominant enabling feature of this material is that this cooling and insulation capability permits device architectures that are potentially nano sized devices such as a nano sensor down to one atom or enclosed doped carbon semiconductors which can be injected into the human body. It could include its own microprocessor and transmitter and micromechanical manipulators for nano surgery. This device can be constructed on an atomic scale when it is considered that doped Fullerenes or Bucky balls and Graphene in combination with Metal Insulator Metal Schottky diodes permit up to 100-300 GHz to Terahertz operation devices, smaller than a grain of sand; indeed on the order of a grain of dust. Such devices exist now in silicon that is ⅛th of a cubic millimeter in volume and can run on 10.5 micro Watts of power derived from an interrogating RF field. Alternately a beta battery could power this device or family of devices.

This disclosure speaks of a smaller device architecture than the silicon example which could be powered by a Nickel 55 beta battery on a single layer an atom thick power cell.

The range of system sizes and types that this architecture enables is due to its internal heat handling capability and power handling per unit size, and is intended for fraction of Watt-hours to Mega Watt-hour systems. Including Utility back up power systems that support power outputs which would run a grid at hundreds of megawatts for weeks at a time.

Some examples leverage the unique properties of the DLC and RSiC material as a high thermal conductivity substrate and a very high voltage encapsulating insulator as well as a compatible carbon based semiconductor when doped or created as Graphene to make discrete circuit components.

Some frequencies of light are transmitted by DLC, and magnetic fields are also transmitted. This permits a device architecture that can utilize encapsulated coils and LEDs or laser chips to operate as input power charging point or RF transmit coils. By extension this allows low voltage electrically isolated command control point of load supplies that are inputted with optical signals such as clock trigger commands that would communicate with receiver & transmit command logic modules on the high voltage side of the isolating DLC wafer. Such approaches permit downloading high voltage power such as might come from a diamond like carbon energy storage unit and convert it to a specific low voltage power application or allow inputting a high voltage AC signal for charging a micro ESU on a nano device.

Some example approaches and benefits:
Electrode materials are generally chosen to be expansion coefficient matched within 0.6 u/K CTE of DLC. (See note 6 for an exception);
Electrodes are encased in DLC except at contact surface or edge;
Materials that add features are applied on outside of DLC layer-example would be Magneto restrictive materials that would limit current in discharge;
DLC layers can be grown indefinitely IF Films are stress relieved during growth example up to 200 nm DLC then layer of Graphite;
Dielectric materials can be Powder or PLD grown ceramic film, or attached in plastic carrier or Glass carrier. But to achieve claimed energy densities they must be used with DLC encapsulated electrodes; and
Very thin DLC layers do not require stress relief and can be grown on non CTE matched materials such as Copper or Aluminum.

ADDITIONAL EXAMPLE APPLICATIONS

The energy densities obtained with the device described herein exceed by a factor greater than 5 the energy density of Lithium-Ion batteries of existing technologies. Furthermore, the device can typically be more rapidly charged, and won't degrade in the manner often seen in rechargeable batteries, and thus may need be replaced less often. The device also typically has less internal current leakage, and thus stays charged longer. The resulting improved device can then be utilized for applications where high-energy density mobile power sources are desired. For example, such a device can be used to power an electric automobile, aircraft, ship, or other transportation device, effectively replacing storage batteries with a more energy-dense, and less environmentally toxic, solution. Furthermore, the dense energy storage will allow for more compact and mobile use of devices requiring large amounts of energy, such as for powering mobile LASERs, electromagnetic weapons (e.g., rail guns), and other such devices.

In addition, the energy storage device could be utilized in arrays of devices for energy storage on a large scale, such as for storing wind or solar electrical energy during peak generation for use at other times when the wind or sun are not available. Also, applications include systems that involve long unattended operational lifetimes, such as powering remote sensors, micro space satellites, or even deep space probes, or systems where recharging capability may be infrequent.

Also, the device can be used on a small scale as a replacement in any device using batteries, as discussed above. This includes portable devices ranging in any size from flashlights to computers, cell phones, and watches, for example. This concept taken to miniature extremes would have all of these features on an integrated circuit in a nano robotic application. One such example would be for a covert listening or locating device about the size of a grain of salt.

Many other example embodiments of the invention can be provided through various combinations of the above described features. Although the invention has been described hereinabove using specific examples and embodiments, it will be understood by those skilled in the art that various alternatives may be used and equivalents may be substituted for elements and/or steps described herein, without necessarily deviating from the intended scope of the invention. Modifications may be necessary to adapt the invention to a particular situation or to particular needs without departing from the intended scope of the invention. It is intended that the invention not be limited to the particular implementations and embodiments described herein, but that the claims be given their broadest reasonable interpretation to cover all novel and non-obvious embodiments, literal or equivalent, disclosed or not, covered thereby.

What is claimed is:

1. An energy storage device for storing electrical energy, comprising:
   a housing;
   a capacitor including a diamond or diamond-like material layer; and
   a voltage step-down component configured to step down the voltage of the capacitor for providing power to a battery powered device,
   wherein said energy storage device is encased in said housing configured to replace one or more removable batteries for installation in the electric device;
   wherein said diamond or diamond-like carbon is comprised in an electrically insulating layer having high heat conductivity.

2. The device of claim 1, wherein said energy storage device is configured to replace a commercially available disposable battery.

3. The device of claim 1, wherein said energy storage device is configured to replace an AAA size disposable battery.

4. The device of claim 1, wherein said energy storage device is configured to replace a C size disposable battery.

5. The device of claim 1, wherein said energy storage device is configured to replace a D size disposable battery.

6. The device of claim 1, wherein said capacitor further comprises a dielectric layer including particles dispersed in an electrically insulating material, said particles including BaTiO3.

7. The device of claim 6, wherein said particles also include $Al_2O_3$.

8. The device of claim 6 further comprising a conducting layer, wherein said conducting layer includes material having a Coefficient of Thermal Expansion that is close to that of the dielectric layer.

9. The device of claim 1, wherein said insulating layer is about 1 micron thick or less.

10. The energy storage device of claim 1, further comprising a voltage converting component configured to convert a source voltage into a charge voltage to charge the capacitor.

11. An energy storage device for storing energy, comprising:
    a housing;
    a capacitor comprising a stack of:
    a first insulating layer comprising an electrically insulating material having at least good heat conductivity,
    a dielectric layer comprising particles dispersed in an electrically insulating material, said particles including BaTiO3,
    a first conducting electrode layer,
    a second conducting electrode layer; and
    a second insulating layer comprising the electrically insulating material having at least good heat conductivity, wherein said dielectric layer is provided between said first conducting electrode layer and said second conducting electrode layer;
    a voltage step-down component configured to step down the voltage of the capacitor to provide power to an electric device, wherein said capacitor is configured to connect to a voltage converting component configured to convert a source voltage into a charge voltage to charge the capacitor; and
    said energy storage device is encased in said housing configured for installation in the electric device;
    wherein said electrically insulating material having at least good heat conductivity includes a material having a diamond-like structure.

12. The device of claim 11, wherein said electrically insulating material having at least good heat conductivity includes carbon.

13. The device of claim 11, wherein said first insulating layer and/or said second insulating layer is about 1 micron thick or less.

14. The device of claim 11, wherein one or both of said first conducting layer or said second conducting layer includes material having a Coefficient of Thermal Expansion that is close to that of the dielectric layer.

15. The device of claim 11, wherein said energy storage device is configured to replace a commercially available disposable battery.

16. The device of claim 11, further comprising a housing, wherein said voltage converting component is included in said energy storage device.

17. An energy storage device for storing energy, comprising:
    a capacitor comprising a stack:
    a first insulating layer comprising an electrically insulating material including a material at least partially organized in a diamond-like structure,
    a dielectric layer comprising particles dispersed in an electrically insulating material, said particles including $BaTiO_3$,
    a first conducting electrode layer,
    a second conducting electrode layer; and
    a second insulating layer comprising the electrically insulating material having at least good heat conductivity, wherein
    said dielectric layer is provided between said first conducting electrode layer and said second conducting electrode layer; and
    a voltage step-down component configured to step down the voltage of the capacitor for providing for power to an electrical device, wherein
    a voltage converting component is provided to convert a utility voltage to a charge voltage for charging the capacitor; and wherein
    said energy storage device is configured for installation in the electric device.

18. An energy storage system comprising:
    a plurality of capacitors, each capacitor comprising a plurality of stacks each including:
    a first insulating layer comprising an electrically insulating material including a material at least partially organized in a diamond-like structure,
    a dielectric layer comprising particles dispersed in an electrically insulating material,
    a first conducting electrode layer,
    a second conducting electrode layer; and a second insulating layer comprising the electrically insulating material having at least good heat conductivity, wherein said dielectric layer is provided between said first conducting electrode layer and said second conducting electrode layer;

a voltage inverting component to convert the output voltage of said plurality of capacitors into an AC voltage for connecting to an electric power grid to provide electrical power to the electric power grid; and a voltage converting component to convert the voltage of a power source to a voltage for charging said plurality of capacitors, wherein each one of said plurality of capacitors outputs energy at a voltage of more than 1000 volts.

19. The energy storage system of claim 18, wherein said electrically insulating material includes diamond or diamond-like carbon.

20. The energy storage system of claim 18, said particles dispersed in the electrically insulating material including $BaTiO_3$.

* * * * *